US008356493B2

(12) United States Patent
Margaryan

(10) Patent No.: US 8,356,493 B2
(45) Date of Patent: Jan. 22, 2013

(54) FLUOROPHOSPHATE GLASS AND METHOD OF MAKING THEREOF

(76) Inventor: Alfred A. Margaryan, Glendlae, CA (US)

( * ) Notice: Subject to any disclaimer, the term of this patent is extended or adjusted under 35 U.S.C. 154(b) by 0 days.

(21) Appl. No.: 13/083,624

(22) Filed: Apr. 11, 2011

(65) Prior Publication Data

US 2011/0179828 A1 Jul. 28, 2011

Related U.S. Application Data

(60) Division of application No. 10/054,328, filed on Jan. 21, 2002, now Pat. No. 7,989,376, which is a continuation-in-part of application No. 09/892,238, filed on Jun. 26, 2001, now abandoned.

(51) Int. Cl.
C03B 25/00 (2006.01)
C03B 5/00 (2006.01)
C03C 3/247 (2006.01)
(52) U.S. Cl. ............. 65/137; 65/32.1; 65/32.5; 65/66; 501/44
(58) Field of Classification Search ............ 65/32.1, 65/32.5, 66, 137; 501/44
See application file for complete search history.

(56) References Cited

U.S. PATENT DOCUMENTS

| | | | |
|---|---|---|---|
| 2,430,539 A | 11/1947 | Sun | |
| 2,481,700 A | 9/1949 | Sun et al. | |
| 2,511,225 A | 6/1950 | Sun | |
| 2,511,227 A | 6/1950 | Sun | |
| 3,846,142 A | 11/1974 | Buzhinsky et al. | |
| 3,941,672 A | 3/1976 | Tanaka et al. | |
| 4,040,846 A | 8/1977 | Broemer et al. | |
| 4,120,814 A | 10/1978 | Izumitani et al. | |
| 4,142,088 A | 2/1979 | Hirsch | |
| 4,182,664 A | 1/1980 | Marklad et al. | |
| 4,225,459 A | 9/1980 | Faulstich et al. | |
| 4,386,163 A * | 5/1983 | Kodama | 501/44 |
| 4,620,863 A | 11/1986 | Tomozawa et al. | |
| 4,642,297 A | 2/1987 | Mennemann et al. | |
| 4,771,020 A | 9/1988 | Omata et al. | |
| 4,885,019 A * | 12/1989 | Hutta | 65/388 |
| 4,946,490 A * | 8/1990 | Hall et al. | 65/32.5 |
| 4,962,067 A | 10/1990 | Myers | |
| 4,990,468 A | 2/1991 | Komiya et al. | |
| 5,017,520 A | 5/1991 | Otsuka et al. | |
| 5,032,315 A | 7/1991 | Hyden et al. | |
| 5,045,507 A * | 9/1991 | Tran | 501/40 |
| 5,068,209 A | 11/1991 | Meinert et al. | |
| 5,526,369 A | 6/1996 | Hayden et al. | |
| 5,635,109 A | 6/1997 | Otsuka | |
| 5,755,998 A * | 5/1998 | Yamazaki et al. | 252/301.4 P |
| 5,809,199 A * | 9/1998 | Tran | 385/141 |
| 5,846,638 A | 12/1998 | Meissner | |
| 6,310,352 B1 | 10/2001 | Gross et al. | |
| 6,429,162 B1 | 8/2002 | Prassas | |
| 6,430,349 B1 | 8/2002 | Hyden et al. | |
| 6,495,481 B1 | 12/2002 | Margaryan | |
| 6,891,470 B2 | 5/2005 | Bohinc, Jr. | |
| 7,088,903 B2 | 8/2006 | Ishioka | |
| 7,211,783 B2 | 5/2007 | Beinhocker | |
| 7,371,703 B2 | 5/2008 | Masumura et al. | |
| 7,394,060 B2 | 7/2008 | Beinhocker | |
| 7,608,551 B2 | 10/2009 | Margaryan et al. | |
| 7,786,446 B2 | 8/2010 | Iwazaki | |
| 7,989,376 B2 | 8/2011 | Margaryan | |
| 2003/0040421 A1 | 2/2003 | Margaryan | |
| 2003/0226971 A1 | 12/2003 | Chandross et al. | |
| 2005/0058424 A1 | 3/2005 | Ishioka | |
| 2005/0188724 A1 | 9/2005 | Ikenishi et al. | |
| 2005/0259944 A1 | 11/2005 | Anderson et al. | |
| 2006/0033983 A1 | 2/2006 | Dai et al. | |
| 2006/0245460 A1 | 11/2006 | Luo et al. | |
| 2007/0010390 A1 | 1/2007 | Margaryan | |
| 2009/0247387 A1 | 10/2009 | Ikenishi | |
| 2009/0255297 A1 | 10/2009 | Margaryan et al. | |

FOREIGN PATENT DOCUMENTS

| | | |
|---|---|---|
| CN | 101269913 A | 9/2008 |
| JP | 57-123842 | 8/1982 |
| JP | 2005075687 | 3/2005 |
| JP | 2005-112717 | 4/2005 |
| JP | 2005112717 | 4/2005 |

OTHER PUBLICATIONS

USPTO Office action for case U.S. Appl. No. 12/607,962, dated Jan. 20, 2012; filed Oct. 28, 2009; Margaryan et al.; This Office Action Cited the Chinese Patent Document CN 101269913A.
Stokowski et al., "Optical and Lasing Properities of Fluorophosphate Glass", Jorunal of Non-Crystaline Solids 40 (1980) 481-487, North Holland Publishing Comppany.
EPO Office action for case 06786351.4; Mar. 16, 2011.
JPO—Office action for JP2008-519723; Dec. 21, 2011.
"The Bismuth Atom Neighborhood in Bismuth Silicate Glasses From X-Ray Absorption Experiment," by Agniezka Witkowska et al., 6th International Conference on Intermolecular Interaction in Matter, Gdansk-Poland, Sep. 10-13, 2001. http://www.mif.pg.gda.pl/iim2001/abstracts/witkowska.html.
"Ultrafast Optical Switch and Wavelength Division Multiplexing (WDM) Amplifiers Based on Bismuth Oxide Glasses", by Naoki Sugimoto, Research Center, Asahi Glass Co., Ltd., Yokohama 221—8755, vol. 85 No. 5, May 2002 Japan http://cat.inist.fr/?aModele=afficheN&cpsidt=13677293.
"Spectroscopic properties of Mn2+ in new bismuth and lead contained fluorophosphates glasses," by A. Margaryan et al., published in Applied Physics, B78, 409-413 (2004).

(Continued)

Primary Examiner — Karl Group
Assistant Examiner — Elizabeth A Bolden
(74) Attorney, Agent, or Firm — Patent Law Agency, LLC; Peter Ganjian

(57) ABSTRACT

New and improved compositions of doped fluorophosphate glasses for lasers have a high refractive index (nD) of approximately 1.6 to 1.7, high transmission in the near infrared part of the spectrum and a wide glass forming domain. These glass systems, $Ba(PO_3)_2$—$Al(PO_3)_3$—$BaF_2$-Dopants, utilize dopants from the group of oxides or fluorides of the rare earth elements Sm, Eu, Nd, Er, Yb, Tm, Tb, Ho and Pr as well as MnO; and mixtures thereof. The composition of glass includes chemical durability, efficiency of laser use in the infrared spectrum and improved duration of luminescence.

10 Claims, No Drawings

OTHER PUBLICATIONS

"Erbium—doped potassium bismuth gallate glass," Wong et al., vol. 19, Issue 8, 1839-1843, Aug. 2002, by S. Q. Man et al., Optics INFOBASE, published by OSA. http://www.opticsinfobase.org/josab/abstract.cfm?uri=josab-19-8-1839.

"Emission properties of PbO-Bi2O3-Ga2O3-Ge2O2 glasses doped with Tm3+ and Ho3+," Jay Hyok Song et al., Photonic Glass Laboratory, Department of Material Science and Engineering, Pohang University of Science and Technology, San 31, Hyoja-dong, Nam-gu, Pohang, Gyeongbuk 790-784, Republic of Korea. Journal of Applied Physics—Jun. 15, 2003, vol. 93, Issue 12, pp. 9441-9445; http://scitation.aip.org/getabs/servlet/GetabsServlet?prog=normal&id=JAPIAU000093000012009441000001&idtype=cvips&gifs=yes.

Optical Engineering, vol. 6, Optical Materials, An Introduction to Selection and Applied, Soloman Musikant, pp. 40 to 45, 1985.

"Physical Properties of Novel Lead Bismuthate Glasses with Large Transmitting Windows", Sun Hong Tao et la., Shanghai Institute of Optics and Fine Mechanics, Chinese Academy of Sciences, Shanghai 201800, 2004 Chinese Physics. Lett. 21 1759-1761; http://www.iop.org/EJ/abstract/0256-307X/21/9/023

Fluorophosphate vitreous systems; "Ligands and Modifiers in Vitreous Materials, Spectroscopy of Condensed Systems," Alfred A. Margaryan, World Scientific Pub. Inc., 1999. http://www.aforesearch.com/scientificpublication.html.

"Spectroscopy of Activated Fluoroberyllate Glasses," Alfred A. Margaryan and Manvel G. Manvelyan, Hayastan Press, Yerevan, 1974, pp. 15-113. http://www.aforesearch.com/scientificpublication.html.

Nuclear and Space Radiation Effects on Materials (NASA Space Vehicle Design Criteria), NASA SP-8053, 1970.

"New Technique to Apply Optical Fiber Image Guide to Nuclear Facilities," Atsushi Kimura, Eiji Takada, Yoneichi Hosono, Masaharu Nakazawa, Hiroyuki Takahashi and Hiroyuki Haymi, Journal of Nuclear Science and Technology, vol. 39, No. 6, pp. 603-607, 2002.

"Radiation Effects Dataon Commercially Available Optical Fiber: Database Summary," Melanie N. Ott, Sigma Research and Engineering, Code 562, NASA Goddard Space Flight Center, Greenbelt, Maryland, USA, 2002.

"Application of General Purpose Fiber Optic Data Links to Radiation Measurements," Eiji Takada and Toshimitsu Komatsu, Journal of Nuclear Science and Technology, vol. 40, No. 6, pp. 363 to 369, 2003.

"Gamm-Radiation Resistant Fabry-Perot Fiber Optic Sensors," Hanying Liu, Don W. Miller and Joseph Talnagi, Review of Scientific Instruments, vol. 73, No. 8, 2002.

"Radiation Damage," Stefania Baccaro, (Italian National Agency for New Technology, Engergy and the Environment, Advanced Physics Technologies), Submitted to World Scientific, Feb. 13, 2002.

"Dopant and concentration dependence of linear and nonlinear refractive index and dispersion for new (Mg, Ba) F2 based Fluorophosphate Glasses," Ju H. Choi, Frank G. Shi, Alfred A. Margaryan, Ashot A. Margaryan, T. G. Nieh, Proc. SPIE, 4970, 82-88, (2003).

"EXAFS spectroscopic study of PbO-Bi2O3-Ga2O3 glasses," Yong Gyu Choi et al., Journal of Non-Crystalline Solids, 259, 205-211 (1999)—Abstract.

"Spectroscopic properties and thermal stability of erbium-doped bismuth-based glass for optical amplifier," Jianhu Yan et al., Shanghai Institute of Optics & fine Mechanics, Chinese Academy of Science, Shanghai 201800, China, Journal of Applied Physics, Jan. 15, 2003, vol. 93, Issue 2, Abstract.

Physics and Chemistry of Rare-Earth Ions Doped Glasses; Editors: Nandyala Sooraj Hussain & José Domingos Da Silva Santos; vols. 46-47;2008; Chapter 2; http://www.aforesearch.com/scientificpublication.html.

Dependence of thermo-mechanical and mechanical properties of novel fluorophosphate glass on various rare earth dopants, Journal of Materials Science vol. 43, No. 3, 2008, pp. 1109-1113; http://www.aforesearch.com/scientificpublication.html http://www.aforesearch.com/scientificpublication.html Novel alkaline-free Er3+-doped fluorophosphate glasses for broadband optical fiber lasers and amplifiers; Journal of Alloys and Compounds, vol. 450, Issues 1-2, 2008, pp. 540-545 http://aforesearch.com/scientificpublication.html.

Fluorescence and Nonradiative Properties of Nd3+ in Novel Heavy Metal Contained Fluorophosphate Glass; Advances in OptoElectronics vol. 2007 (2007), Article ID 39892, 8 pages doi:10.1155/2007/39892 http://www.aforesearch.com/scientificpublication.html.

Rare Earth Doped Photonic Glass Materials for the Miniaturization and Integration of Optoelectronic Devices; From 39th International Symposium on Microelectronics, Oct. 8-12, 2006 San Diego, California, USA http://www.aforesearch.com/scientificpublication.html.

Optical absorption and emission properties of Nd3+ doped fluorophosphates glass for broadband fiber amplifier applications; From Photonics West, Jan. 25-31, 2003, San Jose California, USA. http://www.aforesearch.com/scientificpublication.html.

Spectral properties of Nd 3+ ion in new fluorophosphates glasses: Judd-Ofelt intensity parameters; From Photonics West, Jan. 25-31, 2003, San Jose California, USA. http://www.aforesearch.com/scientificpublication.html.

Novel Broadband and Eye-safe Laser Source Materials: Alkaline-free Yb3+ doped Fluorophosphate Glasses for Fiber and Waveguade Lasers P4. Yb3+ doped Fluorophosphate glasses for fiber and waveguide lasers; From "The International Symposium on Photonic Glasses" Abstract Oct. 14-17, 2002 Shanghai, P.R. China http://www.aforesearch.com/scientificpublication.html.

Refractive index and low dispersion properties of new fluorophosphate glasses highly doped with rare-earth ions; Journal of Materials Research, Jan. 2005—vol. 20, No. 1, pp. 264-270 http://www.aforesearch.com/scientificpublication.html.

Optical transition properties of Yb3+ in new fluorophosphate glasses with high gain coefficient; Journal of Alloys and Compounds 2005—vol. 396, Issue 1-2, pp. 79-85 http://www.aforesearch.com/scientificpublication.html.

Judd—Ofelt analysis of spectroscopic properties of Nd3+-doped novel fluorophosphate glass; Journal of Luminescence, Sep. 2005—vol. 114, Issues 3-4, pp. 167-177 http://www.aforesearch.com/scientificpublication.html.

Spectroscopic properties of Yb3+ in heavy metal contained fluorophosphate glasses; Materials Research Bulletin Dec. 2005—vol. 40, Issue 12, pp. 2189-2197 http://www.aforesearch.com/scientificpublication.html.

Laser damage resistance of photo-thermal-refractive glass bragg gratings; Glebov et al.; University of Central Florida; 2004.

Lasers, Optics, and photonics resources and news; Yb(III) in new fluorophosphate glasses with high gains coefficient; Oct. 29, 2005.

www.AFOResearch.com; Laser Focus World, vol. 44,lssue 6 Jun. 2008; New optical fiber remains transparent under extreme gamma radiation.

www.AFOResearch.com; Laser Focus World, vol. 44, Issue 2 Feb. 2008; Specialty glass.

www.AFOResearch.com; Optical Glass; www.Photonics.com; Mar. 1, 2007.

www.AFOResearch.com; Laser Focus World—Jan. 2007; Fluorophosphate glass.

www.AFOResearch.com; Laser Focus World—Dec. 2006; Fluorophosphate glasses have high spectroscopic quality factors.

www.AFOResearch.com; Lasers, optics and photonics resources and news; Novel Fluorophosphate Glasses with Extremely High Spectroscopic Quality Factors. Nov. 27, 2006.

www.aforesearch.com; Lasers, optics and photonics resources and news; High level Gamma and Neutron radiation resistant non-silica glass; Date announced: Aug. 27, 2005.

www.aforesearch.com Lasers, optics and photonics resources and news; Yb(III) in New Fluorophosphate Glasses with High Gain Coefficient; Date announced: Oct. 29, 2005.

www.aforesearch.com Lasers, optics and photonics resources and news; Heavy Metal Contained Fluorophosphate Glasses with Extremely High Gain Coefficient; Date announced: Nov. 8, 2005.

www.aforesearch.com; From: ALLPOINTS AFO Research's Next Generation Specialty Optical Glasses Provide Market Changing Opportunities for Medical, Commercial Laser, and Communications Industries http://www.aforesearch.com/news/afonews1.html Jan. 25, 2007.

www.aforesearch.com; dallasnews.com; PR Newswire AFO Research's Next Generation Specialty Optical Glasses Provide Market Changing Opportunities for Medical, Commercial Laser, and Communications Industries; Jan. 25, 2007.

www.aforesearch.com; L.A. Times; AFO Research's Next Generation Specialty Optical Glasses Provide Market Changing Opportunities for Medical, Commercial Laser, and Communications Industries; Jan. 25, 2007.

www.aforesearch.com; Welcome to MDMA's Industry News Daily News Headlines from:AFO Research's Next Generation Specialty Optical Glasses Provide Market Changing Opportunities for Medical, Commercial Laser, and Communications Industries; Jan. 25, 2007.

www.aforesearch.com; PR NewsWire; AFO Research's Next Generation Specialty Optical Glasses Provide Market Changing Opportunities for Medical, Commercial Laser, and Communications Industries; Jan. 25, 2007.

PCT/US2006/026169; WO 2007/005953 A3; International search report and PCT application publication: Bismuth containing fluorophosphate glass and method for making thereof. www.wipo.int, Feb. 7, 2007.

PCT/2009/62652; WO 2010/051393; International Search Report and PCT application publication; optical components for use in high energy environments with improved optical characteristics, Mar. 5, 2010.

WO 9913541; Mar. 1999.

Fluorophosphate vitreous systems; From Alfred Margaryan; Legands and Modifiers in Vitreous Materials; Spectroscopy of Condensed Systems; Publisher: World Scientific; Singapore, New Jersey, London Hong Kong; 1999.

USPTO Office action U.S. Appl. No. 12/607,962, filed Oct. 28, 2009; Inventor: Margaryan et al.

Office Action form Canadian Patent Office dated Oct. 4, 2012; Title of Canadian Patent Application: Optical Components for Use In High Energy Environment With Improved Optical Characteristics; First Named Inventor: Alfred A. Margaryan.

WO 2007/005953 A2; Margaryan et al. Jan. 11, 2007; PCT/US2006/026169; U.S. Appl. No. 11/174,486, filed Jul. 5, 2005; Same as US Patent 7608551.

57-123842; Japan; Pub Date: Aug. 2, 1982; Inventor: Kodama Hiroyuke; Abstract in English.

2007-112717; Japan; Pub Date: Apr. 28, 2005, Inventor: Ishioka Junko; Abstract in English.

Letter From Japan Firm in English That May Include Information That May be of Help to Examiner; Includes List of References Cited. Dec. 5, 2012.

Japan Office Action for Case 2011-534788; Dec. 3, 2012.

* cited by examiner

FLUOROPHOSPHATE GLASS AND METHOD OF MAKING THEREOF

CROSS-REFERENCE TO RELATED APPLICATIONS

This Application is a DIVISIONAL application claiming the benefit of priority of the U.S. patent application Ser. No. 10/054,328 with a filing date of 21 Jan. 2002, now allowed and is U.S. Pat. No. 7,989,376, which application is a CONTINUATION-IN-PART application claiming the benefit of priority of the U.S. patent application Ser. No. 09/892,238 with a filing date of 26 JUN. 2001, now abandoned, the entire disclosures of all Applications are expressly incorporated by reference in their entirety herein.

BACKGROUND OF THE INVENTION

1. Field of the Invention

This invention relates to novel compositions of doped fluorophosphates glass. The new and improved glass compositions are particularly useful in laser glass, amplifiers and high density optical storage applications and are based on or contain $Ba(PO_3)_2$, $Al(PO_3)_3$, $BaF_2$ or related fluorides and MnO; or oxides or fluorides of rare earth elements: Nd, Er, Tm, Ho, Pr, Tb, Yb, Sm and Eu; and mixtures thereof.

2. Description of Related Art

Presently most optical laser glasses are manufactured on a $SiO_2$ base. The $SiO_2$ based laser glasses have a limited refractive index of nD=1.40 to 1.45 and a limited infrared transmission spectrum. These limitations prohibit use of $SiO_2$ based glasses in applications for modern laser applications such as the need for glass with efficient transparency in the near and mid infrared frequency range.

There are disclosures of fluorophosphates glass compositions in existing art; however, none of the existing glass compositions provide the efficient transmission qualities of the present invention in the near and mid infrared frequency range used in modern laser applications. Fluorophosphate laser glasses have a higher refractive index and dispersion than glasses with silicon dioxide. The fluorophosphates glasses generally have a refractive index of nD=1.6344 to 1.6412. They can be used as the basis for creating high power lasers.

Fluorophosphate glasses are close to the phosphate glasses in terms of the degree of covalence of the dopant-ligand bond. This has been confirmed by comparison of the Racha coefficient, B, for these glasses. The magnitude of B decreases with a decrease in size of the effective nuclear charge of free ions. The boundaries of glass formation for fluorophosphate glasses with metaphosphates of barium and aluminum and with fluorides of alkaline earth elements create a wide domain of glass forming fluorophosphates that increase in the following order Ba>Sr>Ca>Mg. The presence of barium fluoride, $BaF_2$, with RFx where RFx is from the group $MgF_2$, $CaF_2$, $PbF_2$ and $BiF_3$ effectively increases chemical durability of laser materials.

The phosphate laser glasses of varying composition due to thermal expansion and hardness properties and to low chemical durability or stability are not suited for the laser applications anticipated for the instant invention. These limitations are generally due to the presence of metaphosphates of lithium, sodium and potassium, U.S. Pat. No. 3,846,142.

Existing fluorophosphates laser glass such as the system $BaPO_3F$—$MgF_2$—$Nd_2O_3$—$Ga_2O_3$—MnO have a high rate of inactive absorption of wavelength 1,064 nm, which reduces the luminescence of glass dopants. There also exist a class of fluorophosphate laser glasses that were developed on a base of metaphosphate aluminum and fluorides of metal from the first and second group of the periodic elements. The optical constant for these glasses are in the range (nD) from 1.45 to 1.59 whereas the instant invention exceeds 1.60 for greater laser efficiency, U.S. Pat. Nos. 2,511,225; 2,511,227; 2,481,700 and 2,430,539.

There are several publications that discuss compositions of fluorophosphates glass; however, they do not disclose or anticipate the specific composition of the present invention. Example text references are: Journal De Physique V 4n4, April 1994, Pages 509-512, article of R. Balda, J. Fernandez and A. DePablos.; Journal of Non-Crystalline Solids, Vol. 213-214, June 1997, pages 245-250, article of J. L. Adam, N. Henry Duhamel and J. Y. Allain; and Journal of Chinese Physics Lasers, Chin. Phys. Lasers, Vol. 16, No. 4, April 1989, pages 227-232.

BRIEF SUMMARY OF THE INVENTION

This invention is related to fluorophosphates glass compositions that are used for laser applications, amplifiers and high density optical storage. Fluorophosphate glasses offer many advantages over crystalline materials. Due to unique spectroscopic properties the fluorophosphates vitreous materials can be used for ultraviolet, visual and near infrared optics in the band of 250 to 3,500 nm.

The fluorophosphate glass contains the components $Ba(PO_3)_2$, $Al(PO_3)_3$, $BaF_2$ and RFx where RFx is from the group $MgF_2$, $CaF_2$, $PbF_2$ and $BiF_3$ or related fluorides and MnO; oxides or fluorides of rare earth elements; Nd, Er, Tm, Ho, Pr, Tb, Sm, Eu and Yb; and mixtures thereof. This composition of glass has a high level of chemical durability, laser efficiency and luminescence of dopants.

These and other features, aspects and advantages of the present invention will become better understood with reference to the following drawings, description and claims.

DESCRIPTION OF THE PREFERRED EMBODIMENT

The following detailed description is the best currently contemplated modes for carrying out the invention. The description is not to be taken in a limiting sense, but is made merely for the purpose of illustrating the general principles of the invention.

The preferred material for the present invention are glasses based on or containing $Ba(PO_3)_2$, 5 to 60 mol %; $Al(PO_3)_3$, 5 to 60 mol %; $BaF_2$+RFx, 10 to 90 mol %; and MnO; or oxides or fluorides of rare earth elements: Nd, Er, Tm, Ho, Pr, Tb, Yb, Sm, and Eu; mixtures thereof, 2 to 20 weight %. The raw compounds used for glass formation are: Metaphosphate Barium, $Ba(PO_3)_2$, and Aluminum, $Al(PO_3)_3$, which are considered chemically stable substances. When MnO or $Yb_2O_3$ are used as co-dopant sensitizers the range of dopant is 1 to 20 weight %.

Characteristics of the glass compositions indicate the duration of luminescence for neodymium ions in the laser wavelength 1064 nm is 420 to 450 msec and the half width of luminescence is 160 to 165 $cm^{-1}$. For erbium ions, the duration of luminescence in the laser wavelength 1535 nm is 480 to 500 msec and the half width of luminescence is 150 to 155 $cm^{-1}$.

A neodymium and erbium doped athermal fluorophosphate glass results from the high neodymium and erbium oxide or fluoride concentration of 5 to 20 weight %. Erbium doped fluorophosphate laser glass is more efficient than erbium doped silicate laser glass. Erbium doped fluorophosphate laser glass also has an eye safe operating wavelength of 1535 nm which makes it useful for specialized medical apparatus as well as for range finding equipment. The combination of the base materials and dopants provide an efficient laser glass in the infrared region for laser use.

The preferred glass forming compounds, $Ba(PO_3)_2$ and $Al(PO_3)_3$ are characterized as chemically stable substances. In combination they create a significant free or open volume structure due to the large ionic radii of barium (1.38° A) as in $Ba(PO_3)_2$ and $BaF_2+RFx$. This allows the homogenous and regular distribution of dopant ions in a glass matrix.

The presence of $BaF_2+RFx$ effectively increases the chemical durability of the laser material. In the grouping of glasses according to chemical stability of non-silicate glasses relating to humidity or moisture, these glasses are considered to be stable glasses. During the melting process a chemical integration between $Ba(PO_3)_2$ and $BaF_2$ creates $BaPO_3F$, monofluorophosphate barium.

The melting process is conducted in the temperature range of 1,200° C. to 1,250° C. in vitreous carbon crucibles in a dry argon atmosphere for 4 to 5 hours followed by an annealing temperature range of 320° C. to 340° C. for 8 to 10 hours. In the system of $Ba(PO_3)_2$—$Al(PO_3)_3$—$BaF_2$-RFx with dopants R, including sensitizers MnO and $Yb_2O_3$, two separate glass forming ranges were discovered as illustrated in Table I.

TABLE I

| Range I (in mol %) | | |
|---|---|---|
| $Ba(PO_3)_2$ | $Al(PO_3)_3$ | $BaF_2$ + RFx |
| 0-95 | 0-95 | 5-90 |

| Range II (in mol %) | | |
|---|---|---|
| $Ba(PO_3)_2$ | $Al(PO_3)_3$ | $BaF_2$ + RFx |
| 0-45 | 5-30 | 45-90 |

Examples of effective compositions and properties of the fluorophosphates laser glass for the composition $Ba(PO_3)_2$—$Al(PO_3)_3$—$BaF_2$—RFx-$Nd_2O_3$—$Er_2O_3$ are illustrated in Table II based on mol percent and weight percent.

TABLE II

| Composition of Glass (mol %) | | | Dopant (wt %) | | Refractive | Density | Quantum Yield (%) |
|---|---|---|---|---|---|---|---|
| $Ba(PO_3)_2$ | $Al(PO_3)_3$ | $BaF_2$ + RFx | $Nd_2O_3$ | $Er_2O_3$ | Index(nD) | g/cm³ | Luminescence |
| 40 | 48 | 10 | 2 | | 1.6345 | 3.35 | 45 |
| 35 | 13 | 50 | 2 | | 1.6385 | 3.38 | 60 |
| 28 | 10 | 60 | 2 | | 1.6401 | 3.40 | 65 |
| 10 | 18 | 70 | 10 | | 1.6412 | 3.45 | 70 |
| 40 | 48 | 10 | | 2 | 1.6344 | 3.35 | 50 |
| 35 | 13 | 50 | | 2 | 1.6386 | 3.36 | 63 |
| 28 | 10 | 60 | | 2 | 1.6403 | 3.41 | 66 |
| 10 | 18 | 70 | | 20 | 1.6410 | 3.43 | 75 |
| 5 | 5 | 90 | | 5 | | | |

In the examples of TABLE II MnO and $Yb_2O_3$ would be used as dopant sensitizers.

While the invention has been particularly shown and described with respect to the illustrated and preferred embodiments thereof, it will be understood by those skilled in the art that the foregoing and other changes in form and details may be made therein without departing from the spirit and scope of the invention.

What is claimed is:

1. A method for making fluorophosphates glass comprising the steps of:
   batching the glass components;
   melting the glass components to form a molten mixture;
   cooling the molten glass mixture to a solid state;
   annealing the glass in the solid state;
   slowly cooling the annealing glass to approximately ambient temperature;
   the glass components consisting of on a mol percent basis of:
   $Ba(PO_3)_2$ from 5 to 60 percent;
   $Al(PO_3)_3$ from 5 to 60 percent;
   a fluoride selected from the group of $BaF_2$, $CaF_2$, $MgF_2$, $PbF_2$, and $BiF_3$ from 10 to 90 percent; and
   a dopant from 2 to 15 percent on a mol percent basis selected from the group of $Nd_2O_3$, $Er_2O_3$, $Yb_2O_3$, $Tm_2O_3$, $Tb_2O_3$, $Ho_2O_3$, $Pr_2O_3$ and MnO and mixtures thereof.

2. The method as in claim 1 wherein the melting of the glass is performed in the temperature range of 1,200° C. to 1,250° C. in vitreous carbon crucibles in a dry argon atmosphere for from 4 to 5 hours.

3. The method as in claim 1 wherein the annealing of the glass is performed in the temperature range of 320° C. to 340° C. for from 8 to 10 hours.

4. A method for making fluorophosphates glass comprising the steps of:
   batching the glass components;
   melting the glass components to form a molten mixture;
   cooling the molten glass mixture to a solid state;
   annealing the glass in the solid state;
   slowly cooling the annealing glass to approximately ambient temperature;
   the glass components consisting of on a mol percent basis of:
   $Ba(PO_3)_2$ from 5 to 60 percent;
   $Al(PO_3)_3$ from 5 to 60 percent;
   a fluoride of $BaF_2$+RFx where RFx is selected from the group of, $CaF_2$, $MgF_2$, $PbF_2$, and $BiF_3$ from 10 to 90 percent; and
   a dopant from 2 to 20 percent on a mol percent basis selected from the group of $Nd_2O_3$, $Er_2O_3$, $Yb_2O_3$, $Tm_2O_3$, $Tb_2O_3$, $Ho_2O_3$, $Pr_2O_3$, $Sm_2O_3$, $Eu_2O_3$ and MnO and mixtures thereof.

5. The method as in claim 4 wherein the melting of the glass is performed in the temperature range of 1,200° C. to 1,250° C. in vitreous carbon crucibles in a dry argon atmosphere for from 4 to 5 hours.

6. The method as in claim 4 wherein the annealing of the glass is performed in the temperature range of 320° C. to 340° C. for from 8 to 10 hours.

7. A method for making fluorophosphates glass comprising the steps of:
- batching the glass components;
- melting the glass components to form a molten mixture;
- the melting of the glass is performed in the temperature range of 1,200° C. to 1,250° C.
- in vitreous carbon crucibles in a dry argon atmosphere for from 4 to 5 hours;
- cooling the molten glass mixture to a solid state;
- annealing the glass in the solid state;
- slowly cooling the annealing glass to approximately ambient temperature;
- the glass components comprised on a mol percent basis of:
- $Ba(PO_3)_2$ from 5 to 60 percent;
- $Al(PO_3)_3$ from 5 to 60 percent;
- a fluoride selected from the group of $BaF_2$, $CaF_2$, $MgF_2$, $PbF_2$, and $BiF_3$ from 10 to 90 percent; and
- a dopant from 2 to 15 percent on a mol percent basis selected from the group of $Nd_2O_3$, $Er_2O_3$, $Yb_2O_3$, $Tm_2O_3$, $Tb_2O_3$, $Ho_2O_3$, $Pr_2O_3$ and MnO and mixtures thereof.

8. A method for making fluorophosphates glass comprising the steps of:
- batching the glass components;
- melting the glass components to form a molten mixture;
- cooling the molten glass mixture to a solid state;
- annealing the glass in the solid state;
- the annealing of the glass is performed in the temperature range of 320° C. to 340° C. for from 8 to 10 hours;
- slowly cooling the annealing glass to approximately ambient temperature;
- the glass components comprised on a mol percent basis of:
- $Ba(PO_3)_2$ from 5 to 60 percent;
- $Al(PO_3)_3$ from 5 to 60 percent;
- a fluoride selected from the group of $BaF_2$, $CaF_2$, $MgF_2$, $PbF_2$, and $BiF_3$ from 10 to 90 percent; and
- a dopant from 2 to 15 percent on a mol percent basis selected from the group of $Nd_2O_3$, $Er_2O_3$, $Yb_2O_3$, $Tm_2O_3$, $Tb_2O_3$, $Ho_2O_3$, $Pr_2O_3$ and MnO and mixtures thereof.

9. A method for making fluorophosphates glass comprising the steps of:
- batching the glass components;
- melting the glass components to form a molten mixture;
- the melting of the glass is performed in the temperature range of 1,200° C. to 1,250° C.
- in vitreous carbon crucibles in a dry argon atmosphere for from 4 to 5 hours;
- cooling the molten glass mixture to a solid state;
- annealing the glass in the solid state;
- slowly cooling the annealing glass to approximately ambient temperature;
- the glass components comprised on a mol percent basis of:
- $Ba(PO_3)_2$ from 5 to 60 percent;
- $Al(PO_3)_3$ from 5 to 60 percent;
- a fluoride of $BaF_2$+RFx where RFx is selected from the group of, $CaF_2$, $MgF_2$, $PbF_2$, and $BiF_3$ from 10 to 90 percent; and
- a dopant from 2 to 20 percent on a mol percent basis selected from the group of $Nd_2O_3$, $Er_2O_3$, $Yb_2O_3$, $Tm_2O_3$, $Tb_2O_3$, $Ho_2O_3$, $Pr_2O_3$, $Sm_2O_3$, $Eu_2O_3$ and MnO and mixtures thereof.

10. A method for making fluorophosphates glass comprising the steps of:
- batching the glass components;
- melting the glass components to form a molten mixture;
- cooling the molten glass mixture to a solid state;
- annealing the glass in the solid state;
- the annealing of the glass is performed in the temperature range of 320° C. to 340° C. for from 8 to 10 hours;
- slowly cooling the annealing glass to approximately ambient temperature;
- the glass components comprised on a mol percent basis of:
- $Ba(PO_3)_2$ from 5 to 60 percent;
- $Al(PO_3)_3$ from 5 to 60 percent;
- a fluoride of $BaF_2$+RFx where RFx is selected from the group of, $CaF_2$, $MgF_2$, $PbF_2$, and $BiF_3$ from 10 to 90 percent; and
- a dopant from 2 to 20 percent on a mol percent basis selected from the group of $Nd_2O_3$, $Er_2O_3$, $Yb_2O_3$, $Tm_2O_3$, $Tb_2O_3$, $Ho_2O_3$, $Pr_2O_3$, $Sm_2O_3$, $Eu_2O_3$ and MnO and mixtures thereof.

\* \* \* \* \*